United States Patent
Dury et al.

(10) Patent No.: US 7,106,054 B2
(45) Date of Patent: Sep. 12, 2006

(54) DEVICE FOR SENSING A ROTARY MEMBER SUCH AS A WATER METER TURBINE

(75) Inventors: Hervé Dury, Macon (FR); Serge Bulteau, Julienas (FR); Eric Michaud, Chenas (FR)

(73) Assignee: Actans SAS, (FR)

( * ) Notice: Subject to any disclaimer, the term of this patent is extended or adjusted under 35 U.S.C. 154(b) by 0 days.

(21) Appl. No.: 11/020,637

(22) Filed: Dec. 22, 2004

(65) Prior Publication Data

US 2005/0140364 A1 Jun. 30, 2005

(30) Foreign Application Priority Data

Dec. 31, 2003 (FR) .................................. 03 51240

(51) Int. Cl.
*G01B 7/30* (2006.01)
(52) U.S. Cl. ............... 324/207.25; 702/163; 73/861.78
(58) Field of Classification Search .......... 324/207.25; 702/163; 73/861.78
See application file for complete search history.

(56) References Cited

U.S. PATENT DOCUMENTS 5,450,760 A * 9/1995 Lew et al. ............... 73/861.77
6,012,339 A * 1/2000 Genack et al. ........... 73/861.77

FOREIGN PATENT DOCUMENTS

DE 4137695 5/1993 .................... 3/487
EP 0467753 1/1992 .................... 5/12

OTHER PUBLICATIONS

French Search report dated Jul. 6, 2004. FR 0351240.

* cited by examiner

*Primary Examiner*—Reena Aurora
(74) *Attorney, Agent, or Firm*—Sofer & Haroun, LLP

(57) ABSTRACT

A device for sensing the rotation of a member rotating about an axis XX' comprises m proximity sensors situated in a plane perpendicular to the axis XX' and in m radial directions, m being an integer greater than or equal to 2. A mark fastened to the rotary member and eccentric to the axis XX' modifies the amplitude response of the proximity sensors when the rotary member rotates. An excitation circuit excites the proximity sensors, each sensor supplying an excitation response when it is excited. The amplitude of the excitation response of each of the sensors is compared with a comparison threshold value during a time period referred to as an observation window to supply a logic level 1 or 0 according to whether the response amplitude is greater than or less than the comparison threshold value. The movement of the mark past one of the sensors is identified as a function of the value 0 or 1 of said logic level. The comparison threshold value or the observation window characteristic of a sensor L0, L1 is reset by means of successive iterations using the value 0 or 1 of the logic level when the mark cannot be at the location of the sensor.

13 Claims, 10 Drawing Sheets

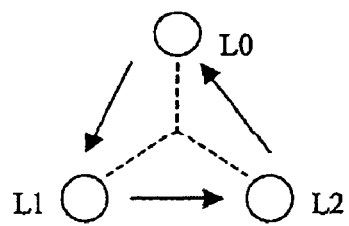 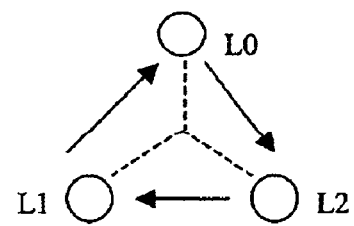
Figure 10                    Figure 11

DEVICE FOR SENSING A ROTARY MEMBER SUCH AS A WATER METER TURBINE

RELATED APPLICATION

This application is related to and claims the benefit of priority from French Patent Application No. 03 51240, filed on Dec. 31, 2003, the entirety of which is incorporated herein by reference.

BACKGROUND OF THE INVENTION

1. Field of the Invention

The invention relates to a device for sensing a rotary member such as a water meter turbine.

2. Description of the Prior Art

Most water meters comprise a mechanically driven totalizator, i.e. the rotation of the turbine drives index rollers of the meter via a mechanical and/or magnetic transmission.

It is also known in the art to sense rotation of the turbine using a proximity sensor facing a rotary member fastened to the turbine and adapted to sense the passage of an eccentric mark on the rotary member. The proximity sensor may use an inductive process, for example, in which case the mark consists of a material whose magnetic and/or electrical characteristics differ from those of the remainder of the rotary member. FIG. 1 illustrates this kind of sensing. The rotary assembly consists of a turbine 1 of a flowmeter, not shown, and a disk 2 fastened to the turbine 1. When a fluid such as water flows, the turbine 1 and the disk 2 rotate about an axis XX'. The rotation speed of the rotary member is directly related to the instantaneous flowrate of the fluid. Two proximity sensors L0 and L1 in a plane P perpendicular to the axis XX' and in two radial directions relative to the axis XX' are sensitive to the proximity of a mark 5 that is fastened to the disk 2 and eccentric to the rotation axis XX'. It follows that when the rotary member rotates, the response of the proximity sensors L0 and L1 varies as a function of the position of the mark 5. For example, the two proximity sensors L0 and L1 are magnetic coils shunted by capacitors, thereby forming two oscillatory circuits disposed in two opposite radial directions. The disk 2 is made of a non-metallic material such as a molded plastic and the mark 5 is a metallized radial sector of the disk.

A sensing system of the above kind gives rise to certain problems, however, because it has a series of parameters that vary as a function of time. For example, for a water meter integrated into a calorimeter, these parameters include the temperature of the water, which may cause the characteristics of the sensor to vary, the supply voltage of the sensing circuit, especially in the case of a battery power supply, and the varying distance between the proximity sensor and the rotary member resulting from the turbine lifting off at high speeds. There is also a series of parameters that vary from one sensor to another and are difficult and costly to control in the context of mass production; for example, for an inductive sensor, these parameters include in particular values of the coil and of its quality coefficient, which leads to the need to sort the sensors or to calibrate each sensor.

One prior art solution to the problems referred to above is described in U.S. Pat. No. 5,187,989. The rotation sensing device described in that document comprises at least two proximity sensors adapted to sense the passage of a mark fastened to the rotary member. The device analyzes the evolution of the signal delivered by a first sensor. As soon as the mark has been sensed by the sensor, the number of turns index is incremented and the second sensor is selected, deselecting the first sensor that has just sensed the mark; the parameters for analyzing the evolution of the signals from the second sensor are then reset; there is obtained in this way an adaptive system that avoids problems associated with variation of the parameters.

The use of a solution of the above kind gives rise to certain problems, however.

This is because the device of this solution uses a complex electronic circuit, resulting not only in a relatively long processing time but also in high power consumption.

SUMMARY OF THE INVENTION

The present invention aims to provide a device for sensing the rotation of a member rotating about an axis XX', said device comprising:

m proximity sensors situated in a plane perpendicular to the axis XX' and in m radial directions, m being an integer greater than or equal to 2, a mark fastened to said rotary member and eccentric to the axis XX' being adapted to modify the amplitude response of said proximity sensors when said rotary member rotates, an excitation circuit adapted to excite said proximity sensors, each of said sensors supplying an excitation response when it is excited, comparison means for comparing the amplitude of the excitation response of each of the sensors with a comparison threshold value during a time period referred to as an observation window and to supply a logic level 1 or 0 according to whether the response amplitude is greater than or less than said comparison threshold value, means for identifying the movement of said mark past one of said sensors as a function of the value 0 or 1 of said logic level, and resetting means for resetting said comparison threshold value or said observation window characteristic of a sensor by means of said successive iterations using the value 0 or 1 of said logic level when said mark cannot be at the location of said sensor.

Thanks to the invention, the resetting of the parameters for identifying the passage of a mark past the sensors is based on a search for those parameters using successive approximations based on binary sensing information, i.e. a comparison value relative to a threshold value. The device of the invention provides a simplified system based on interpretation of binary information instead of direct measurement of the parameters. This binary logic technique using successive approximations saves time and is also suited to an environment requiring low power consumption, the logic circuits used being relatively simple and consuming little energy.

Said rotary member is advantageously made of a non-metallic material and said mark is a metallized portion of said rotary member.

Each proximity sensor is advantageously an oscillatory circuit and said excitation circuit advantageously comprises a pulse generator successively energizing each sensor so that the excitation response of each sensor is an oscillatory signal that is damped to a greater or lesser degree according to whether the mark is or is not at the location of said sensor and comprises a succession of positive and negative lobes of decreasing amplitude, each lobe being numbered successively.

The duration of said observation window advantageously substantially corresponds to the duration of a particular lobe of said excitation response.

The frequency of said pulse generator is advantageously from 50 Hz to 500 Hz and the excitation response of each sensor advantageously has a frequency approximately equal to 250 kHz.

In a particularly advantageous first embodiment of the invention, said comparison means are adapted to receive a variable comparison threshold value so that the amplitude of the excitation response of each of the sensors may be compared with said variable comparison threshold value, said resetting means comprising:

means for determining by successive iterations over a predetermined observation window the amplitude of the excitation response of a sensor when said mark cannot be at the location of said sensor, using the change from one logic state to the other of said logic level resulting from comparison of said amplitude of the excitation response with said variable comparison threshold value, and means for calibrating said comparison threshold value to a value depending on said amplitude of the excitation response determined by said determination means.

Said observation window may advantageously vary in accordance with the lobe selected so that said comparison means are able to effect a comparison over an observation window that is offset temporally as a function of the number of the selected lobe.

In a particularly advantageous second embodiment of the invention, said resetting means comprise:

means for determining by successive iterations, for a fixed comparison threshold value, the lobe number of the excitation response of a sensor when said mark cannot be at the location of said sensor, using the change from one logic state to the other of said logical level resulting from comparison of said excitation response amplitude with said fixed comparison threshold value if the lobe number varies, and means for calibrating said observation window to a value depending on said lobe number determined by said determination means.

Said rotary member advantageously comprises a disk fastened to the turbine of a water meter which may be integrated into a calorimeter adapted to measure the energy delivered by a hot water circuit.

Said comparison threshold value is advantageously a voltage value.

The device of the invention advantageously comprises:

at least three proximity sensors, and means for determining the rotation direction of said rotary member.

Said resetting means advantageously operate in the absence of rotation of said rotary member.

Other features and advantages of the present invention will become apparent in the course of the following description of two illustrative and nonlimiting embodiments of the invention.

BRIEF DESCRIPTION OF THE DRAWINGS

FIGS. 10 and 11 represent three sensors used in one of the devices represented in FIG. 2 or FIG. 6.

DETAILED DESCRIPTION OF THE PREFERRED EMBODIMENTS

Figure 1:
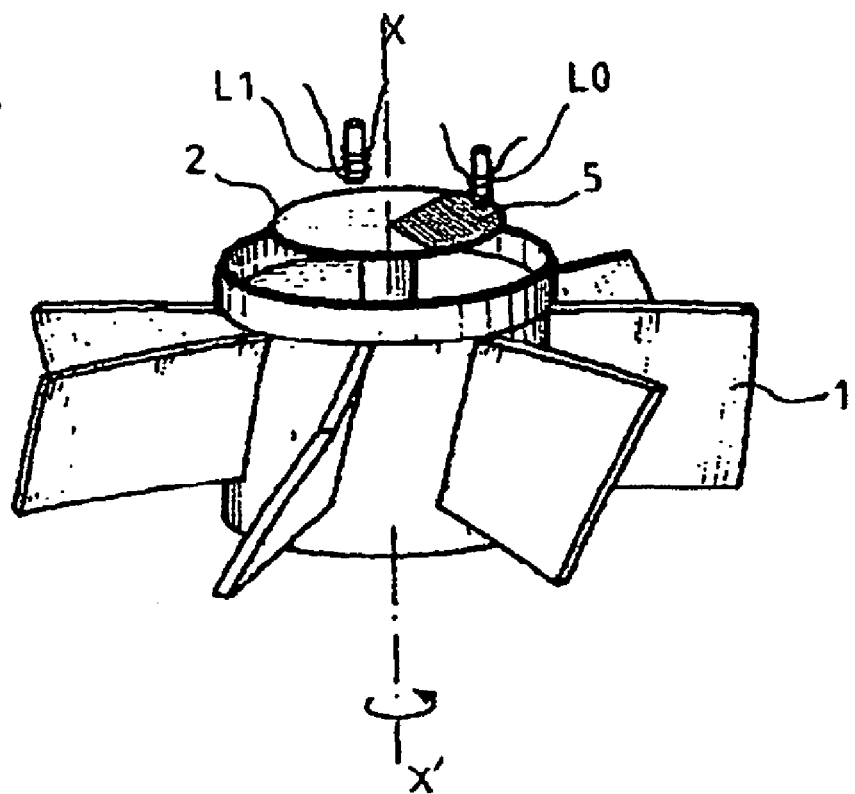
FIG. 1 represents a prior art sensing system.

FIG. 1 has already been described in relation to the prior art.

Figure 2:
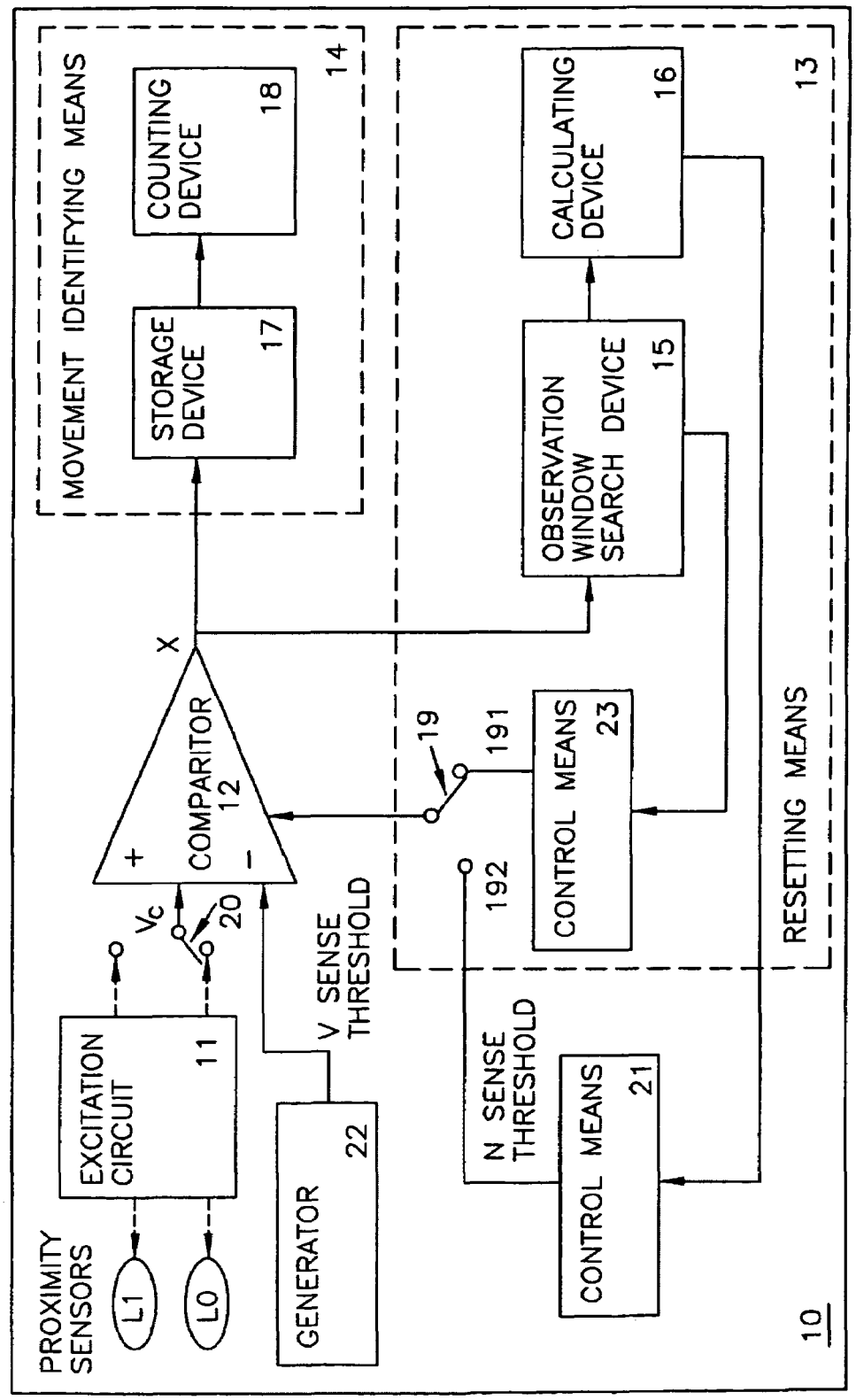
FIG. 2 represents a first embodiment of a sensing device of the invention.

FIG. 2 represents a first embodiment of a device 10 of the invention for sensing the rotation of a rotating member. The device 10 may be used in the FIG. 1 sensing system to sense the rotation of the disk 2 fastened to the turbine 1, for example. It is assumed here that, as in FIG. 1, the disk carries a mark that is eccentric to the axis XX' and modifies the amplitude response of the proximity sensors when the disk rotates.

The device 10 comprises:

two proximity sensors L1 and L0 similar to the FIG. 1 sensors, an excitation circuit 11, a first switch 20, a comparator 12, means 14 for identifying the movement of the mark past the sensor L1 or L0, and resetting means 13.

The excitation circuit 11 excites the two sensors L0 and L1 at the same time and supplies an output voltage Vc corresponding to the excitation response of the sensor L0 or L1.

The switch 20 applies the excitation response of the sensor L0 or L1 to the positive input of the comparator 12.

Figure 3:
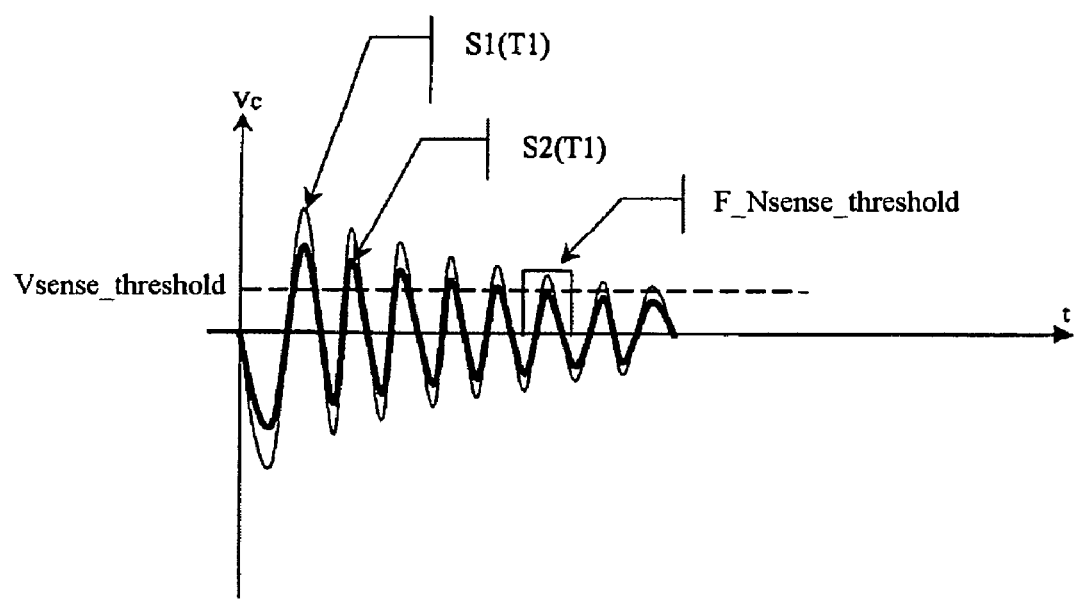
FIGS. 3 to 5 represent signals obtained with a proximity sensor used in the FIG. 2 sensing device.

In normal operation, the voltage Vc is compared to a reference voltage Vsense_threshold supplied by a generator 22. This fixed reference voltage Vsense_threshold is fed to the negative input of the comparator 12. FIG. 3 illustrates this mode of operation, representing two excitation responses S1(T1) and S2(T1) as a function of time obtained at a first temperature T1.

The response S1(T1) is a weakly damped signal indicating that the mark is not under the analyzed sensor.

Note that, just like the signal S2(T1), this signal S1(T1) is an oscillatory signal and therefore comprises a plurality of positive and negative lobes; hereinafter, the positive lobes are numbered one by one.

The comparison of S1(T1) with Vsense_threshold is effected on the lobe numbered Nsense_threshold which defines an observation window F_Nsense_threshold corresponding to the duration of the lobe Nsense_threshold. In FIG. 3, Nsense_threshold is equal to 6. This lobe number defining the observation window is set by the observation window control means 21. A second switch 19 integrated into the resetting means 13, when set to a first position 192, commands comparison over the window F_Nsense_threshold. Note that this command from the control means 21 corresponds to energization of the comparator 12 throughout the duration of the window F_Nsense_threshold.

The amplitude of the signal S1(T1) remains greater than Vsense_threshold over this window F_Nsense_threshold. The comparator 12 therefore provides at its output a logic level X equal to 1, indicating that the mark is not under the analyzed sensor.

Over the same window, the amplitude of the signal S2(T1) falls below the voltage Vsense_threshold. The comparator 12 then supplies at its output a logic level X equal to 0, indicating that the mark is under the analyzed sensor. The means 14 for identifying the movement of the mark past the sensors store this zero state in a storage device 17 and count one half-turn in a counting device 18 (or 1/m turn in the case of m sensors, where m is greater than or equal to 2).

Figure 4:
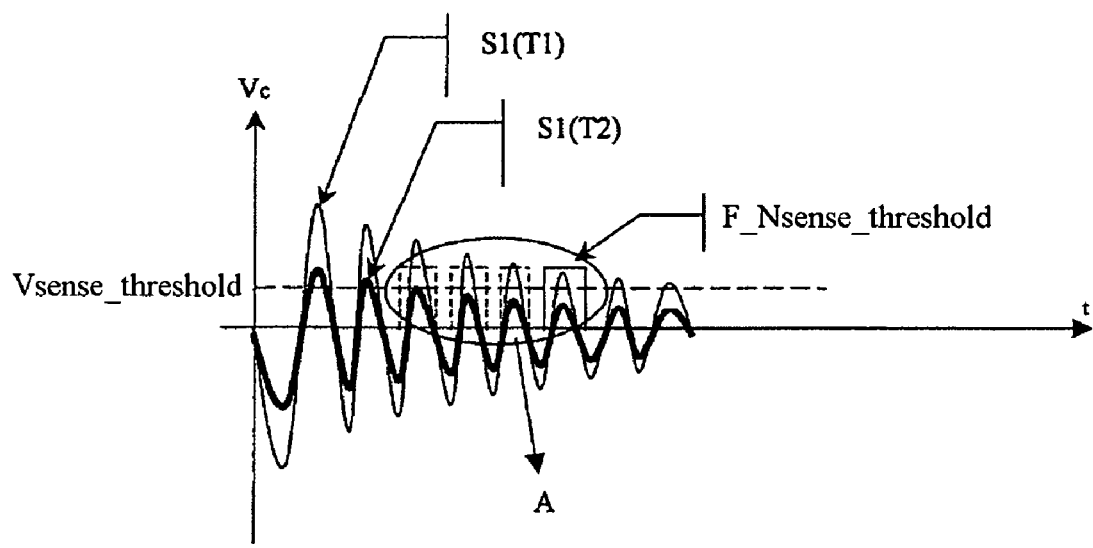

It should be noted that the temperature may change; accordingly, even if the mark is not under either of the sensors, the configuration shown in FIG. 4 may be obtained; this figure shows two excitation responses S1(T1) and S1(T2) as a function of time obtained at the first temperature T1 and at a second temperature T2 higher than the temperature T1, respectively. In both cases, the mark is not under the analyzed sensor.

Note that the signal S1(T2) is systematically below the signal S1(T1); by effecting a comparison over the observation window F_Nsense_threshold previously defined, the amplitude of the signal S1(T2) is already below the threshold Vsense_threshold, whereas it is known that the mark is not under the sensor. It is therefore important to be able to reset F_Nsense_threshold in order to obtain a coherent result. For this purpose, the second switch 19 is set to its second position 191.

The resetting means 13 comprise:

the second switch 19 already defined, control means 23 for injecting a variable observation window into the comparator 12, an observation window search device 15, and a device 16 for calculating F_Nsense_threshold.

Figure 5:
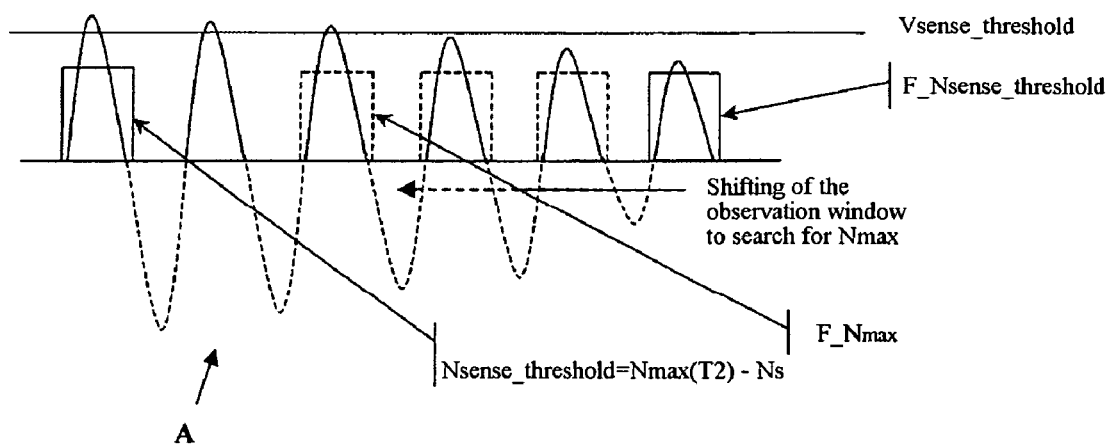

The operating principle of the resetting means 13 is explained in more detail with reference to FIG. 5, which represents to a larger scale the portion A of FIG. 4. For clarity, only the signal S1(T2) is represented.

Remember that, in this configuration, it is known that the mark is not under the analyzed proximity sensor, for example the sensor L0, since the preceding excitation showed that the mark was under the sensor L1 (producing a level X equal to 0); because the switching time of the switch 20 is made much longer than the time taken for the mark to move from the sensor L1 to the sensor L0, it is certain, during the next excitation, that the mark is not yet under the sensor L0.

With the second switch 19 set to its second position 191, the control means 23 shift the observation window toward the left, in the direction of the dashed line arrow, and decrementing the lobe number one by one, until there a window F_Nmax is obtained, corresponding to the lobe placed at the position Nmax, for which the amplitude of the signal S1(T2) rises above the voltage Vsense_threshold. This window F_Nmax is determined by the observation window search device 15 when X changes from 0 to 1.

Once the window F_Nmax and therefore the corresponding lobe number Nmax have been determined, the calculation device 16 uses these values to calculate a reset lobe number Nsense_threshold that is defined by the equation: Nsense_threshold=Nmax−Ns, in which Ns is a known fixed integer specific to each proximity sensor. It is also possible to use a value of Ns common to each of the sensors.

This new value of Nsense_threshold defines a new observation window F_Nsense_threshold for which it is certain that the device 10 will not sense the presence of the mark when the latter is not under the sensor to be analyzed.

The calculation device 16 therefore sends this new value of F_Nsense_threshold to the control means 21, which use it in subsequent sensing operations.

The resetting principle is the same if the amplitude of the signal from the analyzed sensor increases (because of a temperature reduction); in this case, it is necessary to search for a new maximum positive lobe in order for the amplitude of the signal to be above the fixed comparison voltage Vsense_threshold.

Note that all of the means constituting the resetting means 13 may be implemented in software, for example by programming a microprocessor.

Note also that, thanks to the invention, the value of the logic level X is advantageously used both to count the number of rotations and to reset the device in the event of variation of certain parameters such as temperature. Here resetting is effected by varying the observation window and retaining a fixed comparison voltage Vsense_threshold. As will emerge hereinafter in the description of a second embodiment, it is possible to effect resetting by varying the comparison threshold Vsense_threshold and retaining a fixed observation window.

The sensors may be calibrated either every 1/m turn in the case of m sensors, i.e. on each sensing of the mark, or on a more relaxed timescale, as a function of the variation of the influencing parameters, which may vary relatively slowly.

Figure 6:
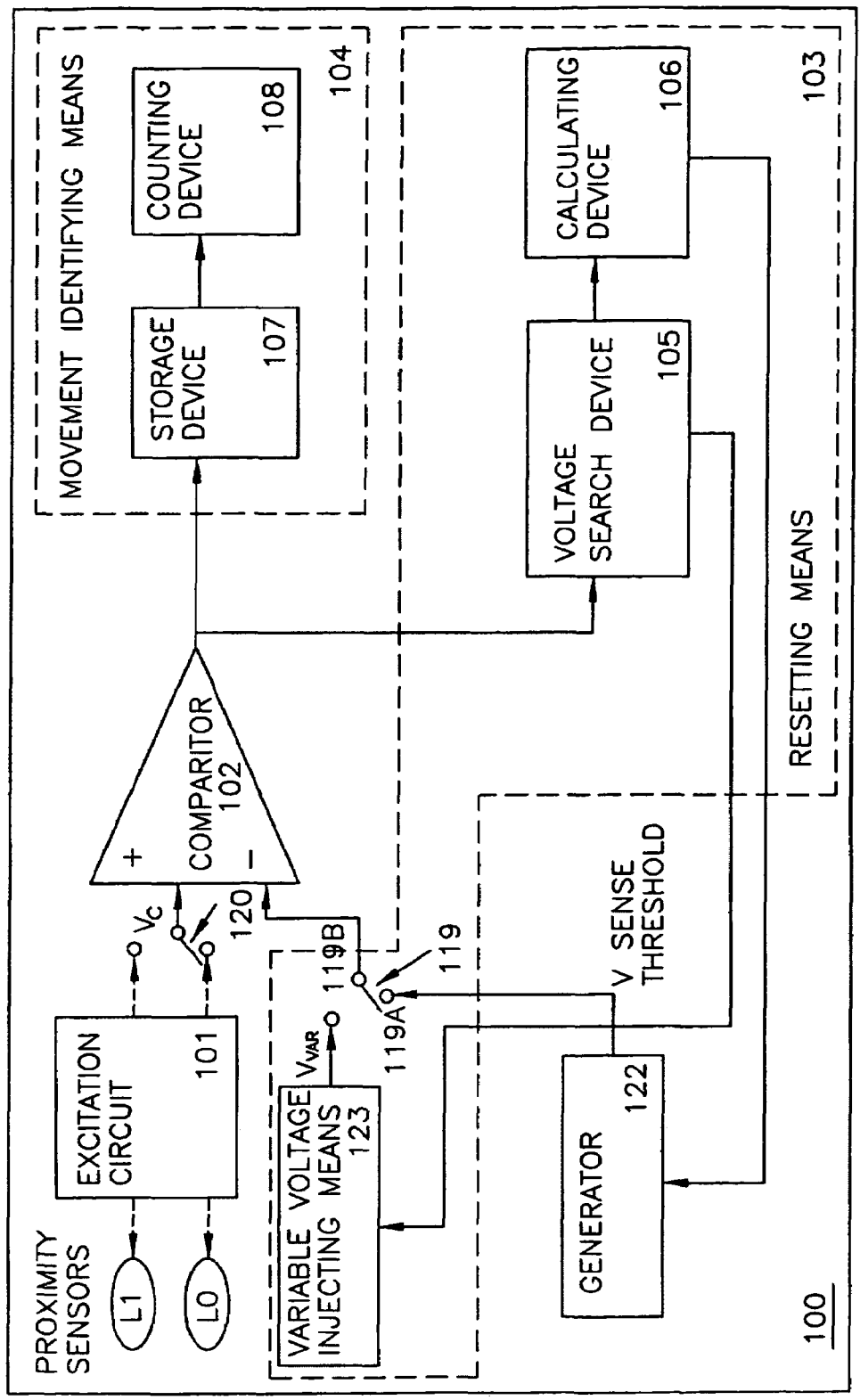
FIG. 6 represents a second embodiment of a sensing device of the invention.

FIG. 6 represents a second embodiment of a device 100 of the invention for sensing the rotation of a rotating member. The device 100 may be used in the FIG. 1 sensing system to sense the rotation of the disk 2 fastened to the turbine 1, for example. It is assumed here that, as in FIG. 1, the disk carries a mark that is eccentric to the axis XX' and modifies the amplitude response of the proximity sensors when the disk rotates.

The device 100 comprises:

two proximity sensors L1 and L0 similar to the FIG. 1 sensors, an excitation circuit 101, a first switch 120, a comparator 102, means 104 for identifying the movement of the mark past the sensor L1 or L0, and resetting means 103.

The excitation circuit 101 excites the two sensors L0 and L1 at the same time and supplies an output voltage Vc corresponding to the excitation response of the sensor L0 or L1.

The switch 120 supplies the excitation response of the sensor L0 or L1 to the positive input of the comparator 102.

Figure 7:
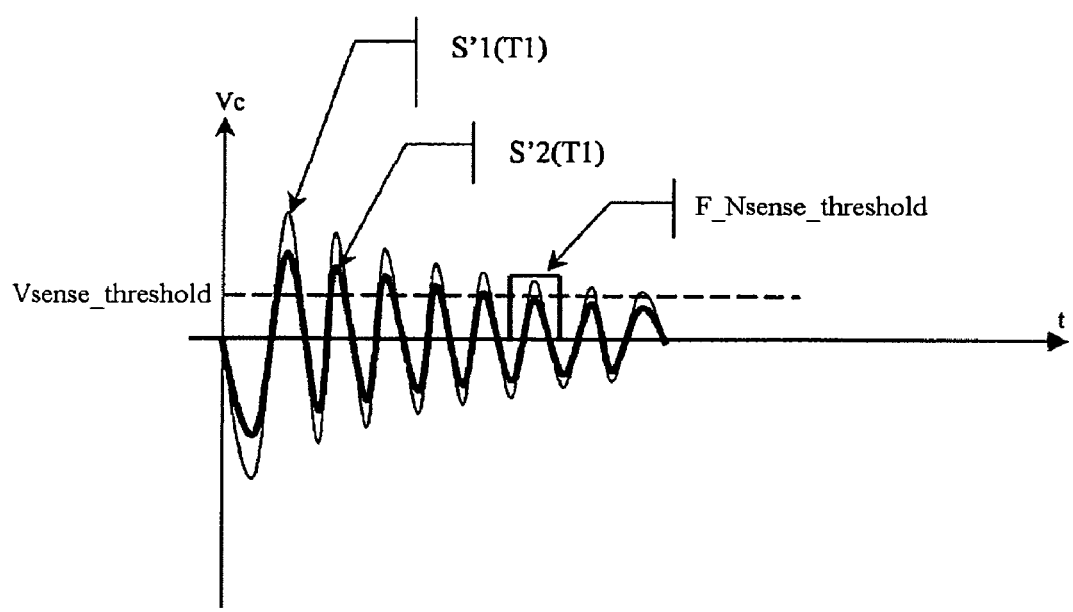
FIGS. 7 to 9 represent signals obtained with a proximity sensor used in the FIG. 6 sensing device.

In normal operation, the voltage Vc is compared to a reference voltage Vsense_threshold supplied by a generator 122. This fixed reference voltage Vsense_threshold is injected into the negative input of the comparator 102. FIG. 7 illustrates this mode of operation, representing two excitation responses S'1(T1) and S'2(T1) as a function of time obtained at a first temperature T1.

The response S'1(T1) is a weakly damped signal indicating that the mark is not under the analyzed sensor.

Note that, like the signal S'2(T1), this signal S'1(T1) is an oscillatory signal and therefore comprises a plurality of positive and negative lobes; hereinafter, the positive lobes are numbered one by one.

The comparison of S'1(T1) with Vsense_threshold is effected on the lobe numbered Nsense_threshold which defines an observation window F_Nsense_threshold corresponding to the duration of the lobe Nsense_threshold. In FIG. 3, Nsense_threshold is equal to 6. This lobe number defining the observation window is fixed. Note that this window F_Nsense_threshold corresponds to the duration of energization of the comparator 102 and the generator 122. The generator 122 is therefore energized only during the window F_Nsense_threshold, which reduces power consumption.

The amplitude of the signal S'1(T1) remains higher than Vsense_threshold over this window F_Nsense_threshold.

The comparator 102 therefore supplies at its output a logic level X equal to 1, indicating that the mark is not under the analyzed sensor.

Over the same window, the amplitude of the signal S'2(T1) falls below the voltage Vsense_threshold. The comparator 102 then supplies at its output a logic level X equal to 0, indicating that the mark is under the analyzed sensor. The means 104 for identifying the movement of the mark past the sensors store this zero state in a storage device 107 and count one half-turn in a counting device 108 (or 1/m turn in the case of m sensors, where m is greater than or equal to 2).

Figure 8:
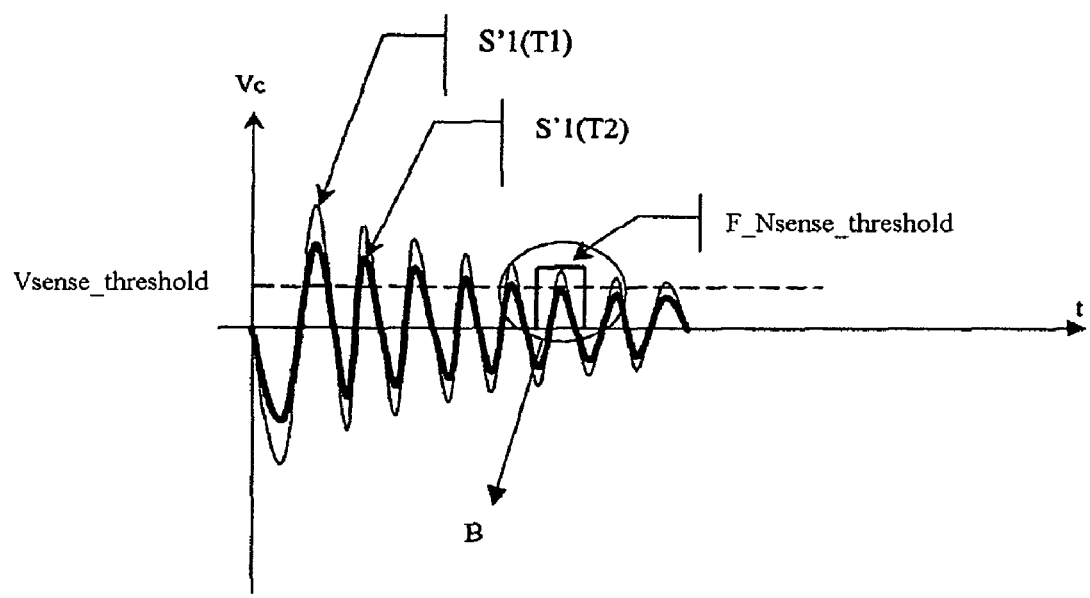

It should be noted that the temperature may change, however; accordingly, even if the mark is not under either of the sensors, the configuration shown in FIG. 8 may be obtained; this figure shows two excitation responses S'1(T1) and S'1(T2) as a function of time obtained at the first temperature T1 and at a second temperature T2 higher than the temperature T1, respectively. In both cases, the mark is not under the analyzed sensor.

Note that the signal S'1(T2) is systematically below the signal S'1(T1); by effecting a comparison over the observation window F_Nsense_threshold previously defined, the amplitude of the signal S'1(T2) is already below the threshold Vsense_threshold, whereas it is known that the mark is not under the sensor. It is therefore important to be able to reset Vsense_threshold in order to obtain a coherent result. The resetting means 103 are used for this purpose, and comprise:
 a second switch 119,
 means 123 for injecting a variable voltage Vvar into the negative input of the comparator 102,
 a voltage search device 105, and
 a device 106 for calculating Vsense_threshold.

Figure 9:
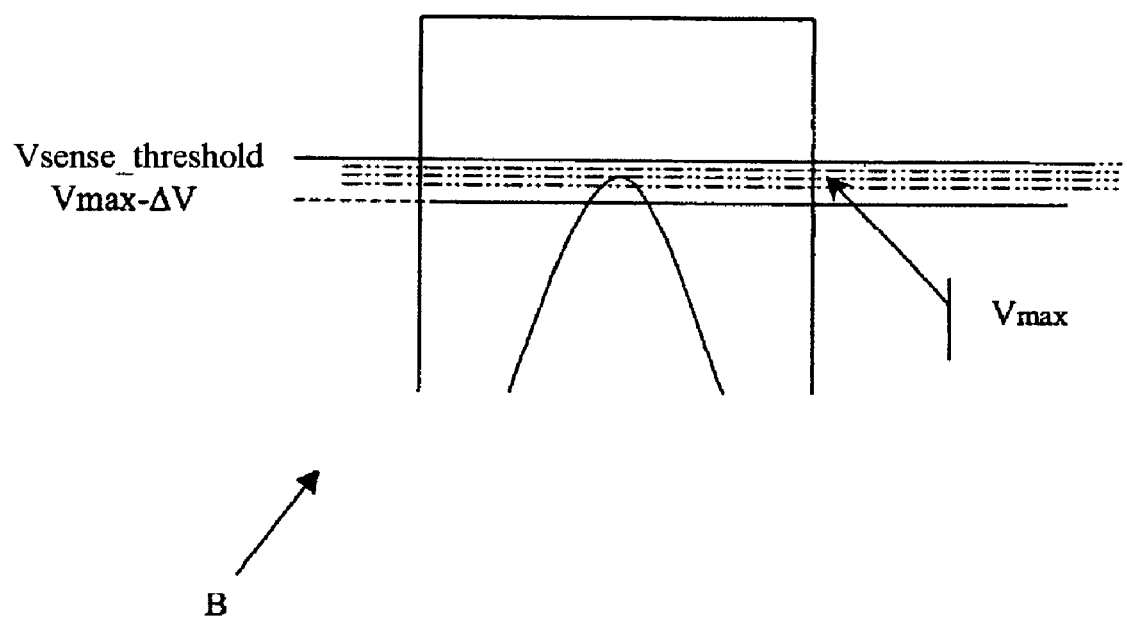

The operating principle of the resetting means 103 is explained in more detail with reference to FIG. 9, which represents to a larger scale the portion B of FIG. 4. For clarity, only the signal S'1(T2) is represented.

Remember that, in this configuration, it is known that the mark is not under the analyzed proximity sensor, for example the sensor L0, since the preceding excitation showed that the mark was under the sensor L1 (producing a level X equal to 0); because the switching time of the switch 120 is made much longer than the time that the mark takes to move from the sensor L1 to the sensor L0, it is certain, during the next excitation that, the mark is not yet under the sensor L0. Accordingly, as soon as the coil L1 is sensed, the coil L0 is calibrated, since it is certain that the sensor L0 is not under the mark during a time period depending on the rotation speed and shape of the target.

The second switch 119 has two positions 119a and 119b. The position during normal operation (i.e. apart from resetting) is the position 119a in which the negative input of the comparator 102 is connected to receive the voltage Vsense_threshold supplied by the generator 122.

On resetting, the switch 119 is set to its second position 119b in order for the means 123 to inject a variable voltage Vvar into the negative input of the comparator 102 and thereby decrease the initial voltage Vsense_threshold at the negative input to a voltage Vmax for which the amplitude of the signal S'1(T2) falls below the voltage Vmax. This voltage Vmax is determined by the voltage search device 105 when X changes from 0 to 1. Accordingly, Vvar is decremented until a logic 1 is obtained.

Once the voltage Vmax has been determined, the device 106 for calculating Vsense_threshold uses this value to calculate a reset voltage Vsense_threshold that is defined by the equation Vsense_threshold=Vmax−ΔV, in which ΔV is a known value specific to each proximity sensor. It is also possible to take a value of ΔV common to the sensors.

The calculation device 106 therefore sends this new value of Vsense_threshold to the generator 122, which uses the new value on subsequent sensing operations.

With this new value of Vsense_threshold, it is certain that the device 100 will not sense the presence of the mark when the latter is not under the sensor to be analyzed.

The principle is the same if the amplitude of the signal from the sensor increases (because of a temperature reduction), i.e. if it is necessary to increase the signal until the device yields the binary information X=0.

Note that the window F_Nsense_threshold also corresponds to the energization time of the means 123. This kind of energization reduces power consumption.

In the two embodiments described with reference to FIGS. 2 and 6, resetting is effected by successive approximations, varying the value of a parameter and interpreting the binary information constituting the logic level X.

The form of resetting explained hereinabove was envisaged only for when the mark is moving; however, it is equally possible to effect this resetting when the mark is not moving. For this purpose, a search is conducted for the voltage Vmax as described above, and this value is compared to the preceding voltage Vmax. If the new value of Vmax is greater than the preceding Vmax, then the new value of Vmax must be used because, if the amplitude from the sensors has increased, even if the sensor is facing the mark, the new value of Vmax may be used if it is greater than the preceding value, which enables the system not to lose count of any turns when the mark begins to turn again in the presence of a flow of fluid.

Of course, the present invention is not limited to the embodiments that have just been described.

In particular, the invention has been described in the situation of two proximity sensors; it is clear that the invention applies equally in the presence of a greater number m of sensors. Thus at least three sensors L0, L1 and L2 may prove necessary for sensing the rotation direction of the disk. FIGS. 10 and 11 show one way of sensing the rotation direction, represented by arrows, which may be either positive, as shown in FIG. 10, or negative, as shown in FIG. 11. The direction may then be determined by the following algorithm:
 a) When L0 (i.e. when Ln with n=0) has been sensed, i.e. when the mark is under L0, if the next sensor sensed is L1 (i.e. Ln+1), then the mark is turning in the positive rotation direction (as in FIG. 10).
 b) When L2 has been sensed, if the next sensor sensed is L1, then the mark is turning in the negative rotation direction (as in FIG. 11).

Similarly, the calculation means have been described as software programmed on a microprocessor, but could equally take the form of hardware.

Note also that temperature has been considered as the parameter causing the characteristics of the sensors to vary. However, other parameters may equally be taken into account (relative humidity, aging, supply voltage, etc.). Calibration allows tracking of variations in the quality coefficient of the sensors.

The invention claimed is:
1. A device for sensing the rotation of a member rotating about an axis XX', said device comprising:
 m proximity sensors situated in a plane perpendicular to the axis XX' and in m radial directions, m being an integer greater than or equal to 2, a mark fastened to said rotary member and eccentric to the axis XX' being adapted to modify an amplitude response of said proximity sensors when said rotary member rotates, an excitation circuit adapted to excite said proximity sensors, each of said sensors supplying an excitation response when it is excited, comparison means for comparing an amplitude of the excitation response of each of the sensors with a comparison threshold value during a time period referred to as an observation window and to supply a logic level 1 or 0 when said amplitude response is greater than or less than said comparison threshold value, means for identifying a movement of said mark past one of said sensors as a function of the value 0 or 1 of said logic level, and resetting means for resetting said comparison threshold value or said observation window characteristic of a sensor by means of successive iterations using the value 0 or 1 of said logic level when said mark cannot be at the location of said sensor.

2. The device claimed in claim 1, wherein said rotary member is made of a non-metallic material and said mark is a metallized portion of said rotary member.

3. The device claimed in claim 1, wherein each proximity sensor is an oscillatory circuit and said excitation circuit comprises a pulse generator successively energizing each sensor so that the excitation response of each sensor is an oscillatory signal that is damped to a greater or lesser degree when the mark is or is not at the location of said sensor and comprises a succession of positive and negative lobes of decreasing amplitude, each lobe being numbered successively.

4. The device claimed in claim 3, wherein a duration of said observation window substantially corresponds to a duration of a particular lobe of said excitation response.

5. The device claimed in claim 4, wherein said observation window may vary in accordance with the lobe selected so that said comparison means are able to effect a comparison over an observation window that is offset temporally as a function of the number of the selected lobe.

6. The device claimed in claim 5, wherein said resetting means comprise:

means for determining by successive iterations, for a fixed comparison threshold value, the lobe number of the excitation response of a sensor when said mark cannot be at the location of said sensor, using the change from one logic state to the other of said logical level resulting from comparison of said excitation response amplitude with said fixed comparison threshold value if the lobe number varies, and means for calibrating said observation window to a value depending on said lobe number determined by said determination means.

7. The device claimed in claim 3, wherein a frequency of said pulse generator is from 50 Hz to 500 Hz.

8. The device claimed in claim 3, wherein the excitation response of each sensor has a frequency approximately equal to 250 kHz.

9. The device claimed in claim 1, wherein said comparison means are adapted to receive a variable comparison threshold value so that the amplitude of the excitation response of each of the sensors may be compared with said variable comparison threshold value, said resetting means comprising:

means for determining by successive iterations over a predetermined observation window the amplitude of the excitation response of a sensor when said mark cannot be at the location of said sensor, using the change from one logic state to the other of said logic level resulting from comparison of said amplitude of the excitation response with said variable comparison threshold value, and means for calibrating said comparison threshold value to a value depending on said amplitude of the excitation response determined by said determination means.

10. The device claimed in claim 1, wherein said rotary member comprises a disk fastened to the turbine of a water meter which may be integrated into a calorimeter adapted to measure an energy delivered by a hot water circuit.

11. The device claimed in claim 1, wherein said comparison threshold value is a voltage value.

12. The device claimed in claim 1, comprising:

at least three proximity sensors, and means for determining the rotation direction of said rotary member.

13. The device claimed in claim 1, wherein said resetting means operate in the absence of rotation of said rotary member.

* * * * *